(12) United States Patent
Ling et al.

(10) Patent No.: US 11,954,681 B2
(45) Date of Patent: Apr. 9, 2024

(54) BLOCKCHAIN-ENHANCED OPEN INTERNET OF THINGS ACCESS ARCHITECTURE

(71) Applicant: SOUTHEAST UNIVERSITY, Nanjing (CN)

(72) Inventors: Xintong Ling, Nanjing (CN); Yuwei Le, Nanjing (CN); Bowen Zhang, Nanjing (CN); Jiaheng Wang, Nanjing (CN); Xiqi Gao, Nanjing (CN)

(73) Assignee: SOUTHEAST UNIVERSITY, Nanjing (CN)

(*) Notice: Subject to any disclaimer, the term of this patent is extended or adjusted under 35 U.S.C. 154(b) by 289 days.

(21) Appl. No.: 17/617,577

(22) PCT Filed: Jun. 16, 2020

(86) PCT No.: PCT/CN2020/096324
§ 371 (c)(1),
(2) Date: Dec. 8, 2021

(87) PCT Pub. No.: WO2021/063030
PCT Pub. Date: Apr. 8, 2021

(65) Prior Publication Data
US 2022/0245634 A1 Aug. 4, 2022

(30) Foreign Application Priority Data

Sep. 30, 2019 (CN) .......................... 201910941713.0
Sep. 30, 2019 (CN) .......................... 201910943188.6

(51) Int. Cl.
*G06Q 20/00* (2012.01)
*G06Q 20/38* (2012.01)
(Continued)

(52) U.S. Cl.
CPC ....... *G06Q 20/401* (2013.01); *G06Q 20/3825* (2013.01); *H04L 9/50* (2022.05);
(Continued)

(58) Field of Classification Search
None
See application file for complete search history.

(56) References Cited

U.S. PATENT DOCUMENTS 10,102,265 B1 * 10/2018 Madisetti ................ G06F 16/27
10,327,123 B1 * 6/2019 Gitlin ................ H04W 74/0833
(Continued)

FOREIGN PATENT DOCUMENTS

CN 108494830 A 9/2018
CN 108684018 A 10/2018
(Continued)

OTHER PUBLICATIONS

Alansari; IoT_ Infrastructure, Architecture, Security and Privacy; IEEE; pp. 150-155; 2018.*
(Continued)

*Primary Examiner* — Radu Andrei
(74) *Attorney, Agent, or Firm* — Bayramoglu Law Offices LLC

(57) ABSTRACT

A blockchain-enhanced open Internet of Things (IoT) access architecture includes an access point, a number of IoT devices, a hash access mechanism, a blockchain mining network, and a blockchain enabling mechanism that manages network access of the IoT device. The blockchain-enhanced open IoT access architecture provided in the present invention provides a secure, reliable, fair, and short-packet access service for a plurality of devices in an IoT network by using features of a blockchain such as distributed storage, tamper-proofing, and traceability, thereby promoting the trust and cooperation between the devices and
(Continued)

ensuring the security and efficiency of the network in the large-scale untrustworthy IoT network. The blockchain-enhanced open IoT access architecture in the present invention can provide secure and reliable IoT access with low latency and a high value in practice.

12 Claims, 4 Drawing Sheets

(51) Int. Cl.
    *G06Q 20/40*     (2012.01)
    *H04L 9/00*     (2022.01)
    *H04W 12/08*     (2021.01)
    *H04W 12/122*     (2021.01)

(52) U.S. Cl.
    CPC ......... *H04W 12/08* (2013.01); *H04W 12/122* (2021.01); *G06Q 2220/00* (2013.01)

(56) References Cited

U.S. PATENT DOCUMENTS

| | | | |
|---|---|---|---|
| 10,373,158 B1* | 8/2019 | James | G06Q 40/04 |
| 10,438,290 B1* | 10/2019 | Winklevoss | G06F 16/1815 |
| 10,505,726 B1* | 12/2019 | Andon | G06Q 30/0185 |
| 10,600,050 B1* | 3/2020 | Anton | G06Q 20/02 |
| 10,657,595 B2* | 5/2020 | de Jong | G06Q 40/04 |
| 10,673,617 B1* | 6/2020 | Antoniou | G06F 13/4282 |
| 10,742,313 B1* | 8/2020 | Favarolo | G06F 9/505 |
| 10,855,475 B1* | 12/2020 | Leach | H04L 9/0637 |
| 10,915,891 B1* | 2/2021 | Winklevoss | H04L 9/3255 |
| 10,924,484 B2* | 2/2021 | Lelcuk | H04L 63/12 |
| 10,929,842 B1* | 2/2021 | Arvanaghi | H04L 9/3239 |
| 10,938,567 B2* | 3/2021 | Martino | G06Q 20/065 |
| 10,939,405 B1* | 3/2021 | Haleem | H04L 9/3239 |
| 10,949,557 B2* | 3/2021 | Patil | G06F 21/6209 |
| 10,999,276 B2* | 5/2021 | Umezurike | H04L 63/0876 |
| 11,004,044 B2* | 5/2021 | Uhr | G06Q 20/3825 |
| 11,074,650 B1* | 7/2021 | Madisetti | G06Q 20/3823 |
| 11,139,955 B1* | 10/2021 | So | G06Q 20/3674 |
| 11,164,107 B1* | 11/2021 | Craib | G06N 20/00 |
| 11,200,569 B1* | 12/2021 | James | G06Q 20/381 |
| 11,232,466 B2* | 1/2022 | Frank | G06Q 30/0203 |
| 11,295,296 B2* | 4/2022 | Snow | G06Q 20/367 |
| 11,316,839 B2* | 4/2022 | Bursell | H04L 63/0435 |
| 11,334,883 B1* | 5/2022 | Auerbach | G06Q 20/223 |
| 11,341,484 B2* | 5/2022 | Wright | H04L 9/3242 |
| 11,399,284 B1* | 7/2022 | Haleem | H04L 63/0428 |
| 11,411,938 B2* | 8/2022 | Bursell | H04L 9/0822 |
| 11,423,016 B2* | 8/2022 | Bellur | G06F 21/64 |
| 11,444,769 B2* | 9/2022 | Wentz | H04L 9/3218 |
| 11,461,310 B2* | 10/2022 | Hughes | H04L 9/3236 |
| 11,468,518 B2* | 10/2022 | Orsini | G05B 15/02 |
| 11,501,370 B1* | 11/2022 | Paya | G06Q 20/3676 |
| 11,522,700 B1* | 12/2022 | Auerbach | H04L 9/3213 |
| 11,606,219 B2* | 3/2023 | Wright | H04L 9/3239 |
| 11,621,973 B2* | 4/2023 | Mylrea | G06F 21/602 726/25 |
| 11,676,122 B2* | 6/2023 | Patterson | H04L 67/1042 705/412 |
| 11,748,825 B2* | 9/2023 | Patterson | G06Q 50/06 705/412 |
| 11,810,027 B2* | 11/2023 | Cella | G06F 9/5016 |
| 2016/0219130 A1* | 7/2016 | Ghosh | H04L 69/22 |
| 2017/0232300 A1* | 8/2017 | Tran | G06F 1/163 434/247 |
| 2017/0345105 A1* | 11/2017 | Isaacson | G06Q 20/40 |
| 2017/0358041 A1* | 12/2017 | Forbes, Jr. | G05D 3/12 |
| 2018/0117446 A1* | 5/2018 | Tran | G06F 1/163 |
| 2018/0117447 A1* | 5/2018 | Tran | G09B 19/0038 |
| 2018/0176229 A1* | 6/2018 | Bathen | H04L 9/3239 |
| 2018/0220278 A1* | 8/2018 | Tal | H04L 9/3236 |
| 2018/0247191 A1* | 8/2018 | Katz | H04L 9/50 |
| 2018/0268382 A1* | 9/2018 | Wasserman | H04L 9/3247 |
| 2018/0270244 A1* | 9/2018 | Kumar | H04W 4/44 |
| 2018/0276626 A1* | 9/2018 | Laiben | G06Q 20/3829 |
| 2018/0307859 A1* | 10/2018 | LaFever | H04L 63/20 |
| 2018/0309567 A1* | 10/2018 | Wooden | H04L 63/12 |
| 2019/0007381 A1* | 1/2019 | Isaacson | G06Q 20/12 |
| 2019/0012637 A1* | 1/2019 | Gillen | H04L 9/0872 |
| 2019/0013948 A1* | 1/2019 | Mercuri | G06Q 20/3827 |
| 2019/0018888 A1* | 1/2019 | Madisetti | H04L 9/0637 |
| 2019/0019144 A1* | 1/2019 | Gillen | H04L 9/3247 |
| 2019/0034923 A1* | 1/2019 | Greco | G06Q 20/389 |
| 2019/0036887 A1* | 1/2019 | Miller | G07C 9/20 |
| 2019/0057454 A1* | 2/2019 | Komenda | H04L 9/3242 |
| 2019/0058581 A1* | 2/2019 | Wood | G06F 16/27 |
| 2019/0080392 A1* | 3/2019 | Youb | G06Q 20/38215 |
| 2019/0109713 A1* | 4/2019 | Clark | G06F 16/182 |
| 2019/0114706 A1* | 4/2019 | Bell | H04L 9/3239 |
| 2019/0123892 A1* | 4/2019 | Basu | H04L 9/0643 |
| 2019/0163887 A1* | 5/2019 | Frederick | H04L 9/3239 |
| 2019/0166133 A1* | 5/2019 | Frederick | G06F 21/44 |
| 2019/0171849 A1* | 6/2019 | Assenmacher | H04L 9/0643 |
| 2019/0173854 A1* | 6/2019 | Beck | H04L 67/10 |
| 2019/0197635 A1* | 6/2019 | Kim | G06Q 20/308 |
| 2019/0213633 A1* | 7/2019 | Kokernak | G06Q 30/0277 |
| 2019/0230070 A1* | 7/2019 | Isaacson | H04W 12/084 |
| 2019/0236286 A1* | 8/2019 | Scriber | H04L 63/0435 |
| 2019/0238379 A1* | 8/2019 | Walk | H04L 27/2627 |
| 2019/0253434 A1* | 8/2019 | Biyani | H04L 9/3297 |
| 2019/0279241 A1* | 9/2019 | DiTomaso | G06F 16/27 |
| 2019/0294817 A1* | 9/2019 | Hennebert | H04L 9/0861 |
| 2019/0294822 A1* | 9/2019 | Hennebert | G06F 21/602 |
| 2019/0306137 A1* | 10/2019 | Isaacson | H04W 12/08 |
| 2019/0319861 A1* | 10/2019 | Pan | H04L 9/0637 |
| 2019/0334886 A1* | 10/2019 | Lelcuk | H04L 9/0637 |
| 2019/0340269 A1* | 11/2019 | Biernat | H04L 63/12 |
| 2019/0340607 A1* | 11/2019 | Lynn | G06Q 20/4014 |
| 2019/0340716 A1* | 11/2019 | Cella | G06Q 30/0201 |
| 2019/0347433 A1* | 11/2019 | Chakravorty | H04L 9/30 |
| 2019/0349426 A1* | 11/2019 | Smith | H04L 67/104 |
| 2019/0354944 A1* | 11/2019 | Russinovich | H04L 9/3239 |
| 2019/0361869 A1* | 11/2019 | Krabbenhöft | G06F 16/2379 |
| 2019/0361917 A1* | 11/2019 | Tran | H04W 12/108 |
| 2019/0370760 A1* | 12/2019 | Kundu | H04L 9/3239 |
| 2019/0373137 A1* | 12/2019 | Krukar | H04N 1/444 |
| 2019/0373472 A1* | 12/2019 | Smith | H04W 4/70 |
| 2019/0375373 A1* | 12/2019 | Pepe | H04M 1/724098 |
| 2019/0386969 A1* | 12/2019 | Verzun | H04L 63/123 |
| 2019/0392489 A1* | 12/2019 | Tietzen | G06Q 20/308 |
| 2020/0007513 A1* | 1/2020 | Gleichauf | G06F 21/105 |
| 2020/0008099 A1* | 1/2020 | Qiao | H04W 28/04 |
| 2020/0019864 A1* | 1/2020 | Gu | G05B 19/4183 |
| 2020/0042989 A1* | 2/2020 | Ramadoss | G06Q 50/167 |
| 2020/0052887 A1* | 2/2020 | Fitzgerald | H03M 7/702 |
| 2020/0136847 A1* | 4/2020 | Serwatowski | G06F 16/1834 |
| 2020/0143085 A1* | 5/2020 | Cooner | G06F 21/6263 |
| 2020/0143300 A1* | 5/2020 | Weldemariam | G06F 21/572 |
| 2020/0145214 A1* | 5/2020 | Linton | H04L 9/3218 |
| 2020/0167459 A1* | 5/2020 | Viale | G06F 16/27 |
| 2020/0184469 A1* | 6/2020 | Austin | G06Q 20/385 |
| 2020/0186607 A1* | 6/2020 | Murphy | G06Q 40/12 |
| 2020/0219093 A1* | 7/2020 | Malhotra | G06Q 20/389 |
| 2020/0250168 A1* | 8/2020 | Xu | G06F 16/2336 |
| 2020/0250747 A1* | 8/2020 | Padmanabhan | G06Q 20/065 |
| 2020/0258152 A1* | 8/2020 | Naggar | H04L 9/50 |
| 2020/0259653 A1* | 8/2020 | Endress | G06Q 30/018 |
| 2020/0266989 A1* | 8/2020 | Krcmaricic-Barackov | H04L 9/30 |
| 2020/0273003 A1* | 8/2020 | Swami | G06Q 20/102 |
| 2020/0273024 A1* | 8/2020 | Gorilovsky | H04W 12/037 |
| 2020/0274830 A1* | 8/2020 | Swami | G06F 7/483 |
| 2020/0294128 A1* | 9/2020 | Cella | H04L 9/3239 |
| 2020/0311816 A1* | 10/2020 | Calvin | H04L 9/50 |
| 2020/0320518 A1* | 10/2020 | Simas | H04L 9/3247 |
| 2020/0327250 A1* | 10/2020 | Wang | G06N 20/00 |
| 2020/0344132 A1* | 10/2020 | Padmanabhan | H04L 9/0637 |
| 2020/0349564 A1* | 11/2020 | Padmanabhan | H04L 63/123 |
| 2020/0364358 A1* | 11/2020 | Karia | G06Q 20/3829 |
| 2020/0379856 A1* | 12/2020 | Jayachandran | G06F 16/2365 |
| 2020/0379977 A1* | 12/2020 | Saket | H04L 9/3218 |
| 2020/0380154 A1* | 12/2020 | Jayachandran | H04L 9/3247 |

(56) References Cited

U.S. PATENT DOCUMENTS

| | | | |
|---|---|---|---|
| 2020/0382279 A1* | 12/2020 | Jayachandran | G06F 16/1834 |
| 2020/0382280 A1* | 12/2020 | Jayachandran | G06Q 20/382 |
| 2020/0382301 A1* | 12/2020 | Saket | H04L 9/3228 |
| 2020/0382309 A1* | 12/2020 | Jayachandran | H04L 9/3297 |
| 2020/0382310 A1* | 12/2020 | Jayachandran | H04L 9/3239 |
| 2020/0389290 A1* | 12/2020 | Bathen | G11B 7/004 |
| 2020/0389537 A1* | 12/2020 | Mercuri | H04L 9/0643 |
| 2020/0394183 A1* | 12/2020 | Jois | G06F 16/9024 |
| 2020/0412521 A1* | 12/2020 | Shi | G06Q 20/308 |
| 2021/0004794 A1* | 1/2021 | Kumar Kumaresan | G06Q 30/0645 |
| 2021/0029126 A1* | 1/2021 | Moon | H04L 9/50 |
| 2021/0073212 A1* | 3/2021 | Conley | H04L 9/3213 |
| 2021/0073913 A1* | 3/2021 | Ingargiola | H04L 67/104 |
| 2021/0081216 A1* | 3/2021 | Komarov | H04L 9/3239 |
| 2021/0083876 A1* | 3/2021 | Harms | H04L 9/3239 |
| 2021/0105608 A1* | 4/2021 | Mercuri | G06F 21/64 |
| 2021/0135785 A1* | 5/2021 | Robert Safavi | H04L 1/0061 |
| 2021/0271665 A1* | 9/2021 | Jetzfellner | G06F 16/2379 |
| 2022/0180374 A1* | 6/2022 | Cooner | G06Q 20/145 |
| 2022/0294650 A1* | 9/2022 | Tanimoto | H04L 9/3271 |
| 2022/0303075 A1* | 9/2022 | Pitaval | H04L 5/0016 |
| 2023/0156455 A1* | 5/2023 | Salkinzis | H04W 12/35 705/75 |

FOREIGN PATENT DOCUMENTS

| | | |
|---|---|---|
| CN | 110035440 A | 7/2019 |
| CN | 110602252 A | 12/2019 |
| CN | 110691420 A | 1/2020 |
| WO | 2018125989 A2 | 7/2018 |

OTHER PUBLICATIONS

Anand; Security Intensification using Blockchain coupled with IoT; ICAC3N; pp. 2044-2048; 2022.*

Cao; Blockchain-Enabled Internet of Things; IEEE IoT; pp. 7876-7878; 2022.*

Clark; Towards the Future Internet Architecture (RFC1287); ip.com; 30 pages; 2019.*

Gaitan; Gradual Development of an IoT Architecture for Real-World Things; IEEE; pp. 344-349; 2015.*

Lin; The research on IoT application architecture based on web; Wartia; pp. 184-187; 2014.*

Lohstroh; Enabling Technologies for IoT; IEEE; pp. 27244-27256; 2019.*

Mishra; Cloud of Things and Blockchain Integration; AISC; pp. 1150-1154; 2023.*

Stoyanov; Virtual Physical Space; An Architecture Supporting IoT; Plovdiv University; 3 pages; 2018.*

Zhang; Overview of IoT Security Architecture; IEEE DSC; pp. 338-345; 2019.*

* cited by examiner

BLOCKCHAIN-ENHANCED OPEN INTERNET OF THINGS ACCESS ARCHITECTURE

CROSS REFERENCE TO THE RELATED APPLICATIONS

This application is the national phase entry of International Application No. PCT/CN2020/096324, filed on Jun. 16, 2020, which is based upon and claims priority to Chinese Patent Application No. 201910943188.6, filed on Sep. 30, 2019, and Chinese Patent Application No. 201910941713.0, filed on Sep. 30, 2019, the entire contents of which are incorporated herein by reference.

TECHNICAL FIELD

The present invention relates to the field of Internet of Things (IoT) and wireless communication technologies, and in particular, to a blockchain-enhanced open IoT access architecture.

BACKGROUND

When the cryptocurrency Bitcoin was invented in 2008, the supporting technology behind Bitcoin, namely blockchain, officially appeared in public. An electronic cash transaction system based on Bitcoin broke the original pattern in which legal tender is used as a unique transaction token, created a totally new decentralized transaction mechanism in which transactions are recorded in head-to-tail connected blocks and stored in each node of a network through the cryptography theory and the distributed consensus mechanism, and brought a huge value because of its features such as decentralization, security, and tamper-proof. With development in a recent decade, the blockchain technology has experienced several phases, developing from the blockchain 1.0 in which the technology completely serves the cryptocurrency and the blockchain 2.0 represented by smart contracts to the blockchain 3.0 that is represented by cross-domain comprehensive applications.

At the same time of entering the era of blockchain 3.0 of cross-domain applications and integration, IoT as a frontier technology quickly developed in recent years and arouse a great deal of research interest of the industry and academia. It is promising for combining the blockchain technology with the IoT network as one of core fields for the future IoT study. In Mobile World Congress 2018, Federal Communications Commission has expected the integration of the blockchain technology and future wireless communication network technology.

With the rapid development of the IoT technology, the IoT is to constantly expand in scale and the number of IoT devices is to grow exponentially. In practice, an IoT network usually includes a massive number of untrusted devices that may belong to multiple different operators or manufacturers, which means that, in such an environment, there is no significant trust and cooperation between the devices. Limitations caused by the existing IoT architecture based on one dominant operator or manufacturer appear increasingly conspicuous. Therefore, a new multi-operator collaboration IoT access architecture in an untrustworthy environment is urgent to break through many bottlenecks of the conventional IoT access architecture including resource sharing, incentive mechanism, and network security. A blockchain-enhanced open IoT access architecture provided in the present invention can provide a feasible and efficient upgraded solution of an IoT access architecture by making full use of features of the blockchain such as distributed storage, tamper-proof, and traceability and integrating the hash access mechanism proposed recently.

SUMMARY

The present invention aims to provide a blockchain-enhanced open IoT access architecture to resolve the aforementioned problem. In the proposed architecture, a secure and reliable short-packet access service can be conducted between an access point and an IoT device in an untrustworthy environment, which can effectively overcome shortcomings of a conventional IoT access architecture, resolve the problem of multi-party trust in distributed IoT access, promote multi-party cooperation in a network, and improve the overall efficiency.

To achieve the above objective, a method used in the present invention is: a blockchain-enhanced open IoT access architecture, including: an access point, an IoT device, a blockchain mining network, and a core network, where the access point provides a short-packet access service to the IoT device, and a process of the service is controlled by a blockchain enabling mechanism that manages IoT access.

As an improvement of the present invention, control steps of the blockchain enabling mechanism are as follows:

1) depositing, by the IoT device, a predetermined amount of tokens into a blockchain account of the IoT device before accessing an IoT network, where registration information is recorded in a blockchain;

2) filling in and signing, by the IoT device, a smart contract including details of the access service before the service starts, and performing, by the IoT device, a hash operation by using the smart contract, a to-be-transmitted short packet, a device identification code, and a timestamp, where when a hash operation output of the IoT device meets an access request set by the access point, the IoT device sends the smart contract, the to-be-transmitted short packet, and the hash value that meets the requirement to the access point together to request the access point to provide the corresponding short-packet access service;

3) checking and verifying, by the access point after receiving the short packet and the smart contract from the IoT device, whether the hash operation output of the IoT device has an access qualification required by the current access point, and checking and verifying content and a signature of the smart contract, and an account balance of the IoT device, where after the verification succeeds, the access point uploads the smart contract and a hash value of the short packet to the blockchain mining network, and meanwhile directly uploads the short packet sent from the IoT device to the core network to complete the access service;

4) recording, by the blockchain mining network, the smart contract in the blockchain, after checking and verifying the smart contract that includes an access request and that is sent by the IoT device, after a predetermined number of subsequent blocks confirm the smart contract, a service fee specified in the smart contract being automatically transferred from the IoT device account to an access point account to achieve a final settlement of the service fee, where if the smart contract is not successfully confirmed in the blockchain, the access point uploads the smart contract to the mining network again out of self-benefit until the smart contract is confirmed in the blockchain, that is, ensures that the transaction is completed and the IoT device successfully pays the service fee to the access point.

As an improvement of the present invention, the details of the access service in step 2 include: a fee of the access service, relevant access control information, and digital signatures of the IoT device and the access point.

As an improvement of the present invention, the hash value operated by the IoT device in step 2 plays a role in verifying the access request of the IoT device, and specifically in step 2, the IoT device concatenates head-to-tail the four types of data: the smart contract, the to-be-transmitted short packet, the device identification code, and the timestamp to obtain a data string, and further converts the data string by using the hash function into an easy-to-verify, hard-to-solve, and tamper-proof string of a fixed length. The hash function is irreversible, collision resistant, and easy to verify. Storing the hash value into the blockchain can ensure that data uploaded by the access point is secure. If there is an error in the access point and wrong information is uploaded to the core network, the IoT device can trace back and prosecute the access point according to information recorded in the blockchain. The checking and verifying, by the access point, the hash operation output of the IoT device in step 3 is checking whether the hash operation output meets the access qualification required by the current access point. If the hash operation output does not meet the access qualification required by the current access point, the access point immediately terminates the step and refuses to provide the service to the IoT device.

As an improvement of the present invention, after receiving the access request, the access point needs to further check and verify the content of the smart contract sent by the IoT device, and check the balance of the IoT device that initiates the access request, and once the verification succeeds, the access point directly provides the short-packet access service to the IoT device, that is, forwards the short packet to the core network without waiting for the smart contract to be confirmed in the blockchain. Providing an access service before an IoT device successfully pays a service fee may greatly reduce the latency of a short-packet access service, which is particularly applicable to service requirements in an IoT access scenario.

As an improvement of the present invention, the checking the account balance of the IoT device in step 3 is specifically: checking whether the account balance of the IoT device is enough to pay for the service fee, and if the account balance is not enough to pay for the service fee, the access point ignores the access request of the IoT device.

As an improvement of the present invention, a cross-network integrated open IoT specifically indicates that a plurality of operators or manufacturers are connected to form a whole by using the blockchain-enhanced open IoT access architecture. The cross-network integrated open IoT allows fair access of all devices instead of IoT devices belonging to a specific operator or manufacturer, and ensures openness and transparency of the access and payment process through a blockchain.

A hash access is combined with a blockchain architecture. The hash access forces all IoT devices to calculate hash values of relevant data to fairly contend for channel resources. The advantage of combining the hash access and the blockchain architecture is that it can be detected according to the difference between the hash value of data uploaded to the core network and the corresponding value in the blockchain if an access point uploads a packet of the IoT device dishonestly, or an error occurs in uploading. In addition, the service fee of the IoT device is pre-deposited in the blockchain, so that after the access point completes the transaction, the smart contract automatically ensures that the service fee is transferred from the IoT device account to an access point account, thereby avoiding a situation in which the IoT device defaults on the fee. In case the smart contract fails to be uploaded to the blockchain, the access point may repeatedly try to upload the smart contract including the signature of the IoT device to the blockchain until the blockchain confirms and accepts the smart contract.

Advantageous Effect

The blockchain-enhanced open IoT access architecture in the present invention resolves the trust problem of a conventional IoT network access architecture by effectively using features of the blockchain such as distributed storage, tamper-proof, and traceability, and is applicable to a trustless IoT scenario including a plurality of operators or manufacturers. A fair access service transaction between an IoT device and an access point in the network can be conducted in an untrustworthy environment. The present invention, by using features of the blockchain, ensures a secure, reliable, fair, and just interaction process between devices and access points in an IoT network, promotes a high-degree cooperation between a plurality of devices in the network, and improves the resource utilization rate, being greatly beneficial to deployment of a large-scale IoT scenario. In addition, the service-before-payment mechanism in the present invention can greatly reduce an access latency of an IoT device, is applicable to an IoT scenario of a low-latency short packet, and has high practical deployment and application values.

DETAILED DESCRIPTION OF THE EMBODIMENTS

Figure 1:
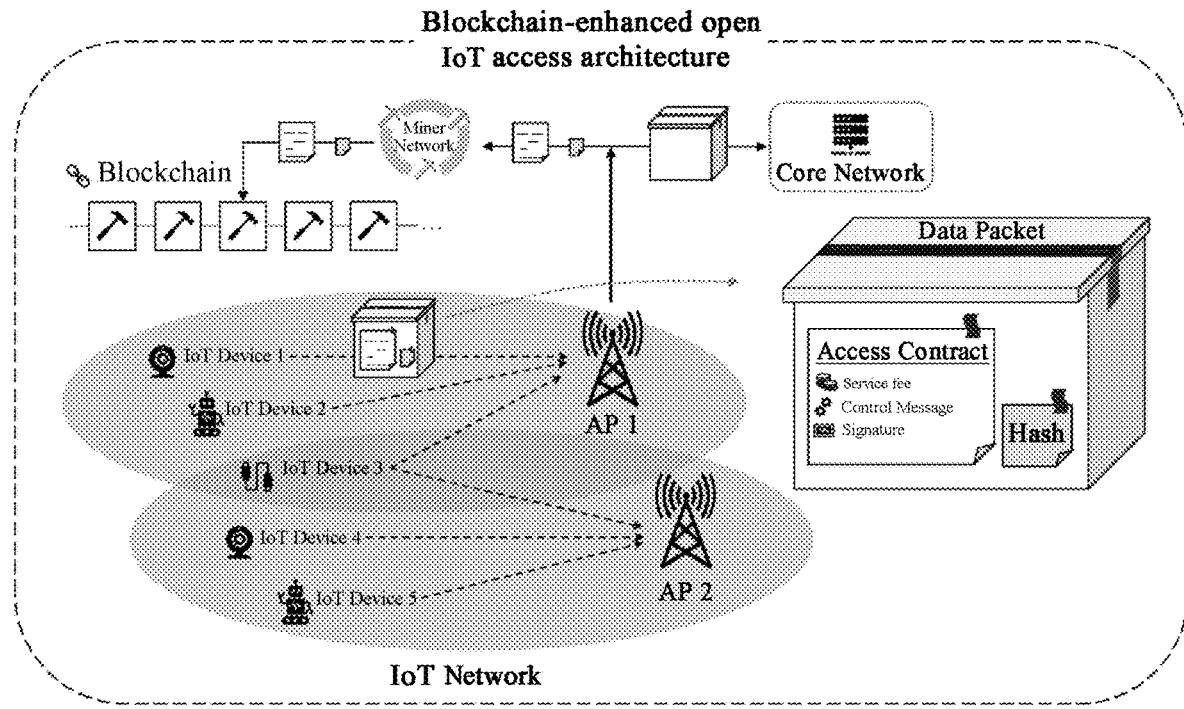
FIG. 1 shows a blockchain-enhanced open IoT access architecture.

To better learn technical content of the present invention, specific examples with reference to the accompanying drawings are used as follows:

Referring to FIG. 1, a blockchain-enhanced open IoT access architecture includes an access point, a number of IoT devices, a blockchain mining network consisting of many miners, and a core network. A fair and open access service can be conducted between the access point and the IoT device. The access point charges the IoT device for a predetermined amount of service fee and provides a corresponding access service to the IoT device. The IoT device deposits a predetermined amount of tokens into a blockchain online account before accessing an IoT network and its registration information is recorded in a blockchain as a public ledger. Before the transaction, the IoT device and the access point negotiate service content and details and reach a consensus through a radio channel. When an access service is required, the IoT device fills in and signs a smart contract including details of the corresponding access service, and performs a hash operation by using the smart contract, a to-be-transmitted short packet, an IoT device identification code, and a current timestamp. When a hash operation output of the IoT device meets an access qualification required by the access point, the IoT device sends the smart contract, the to-be-transmitted short packet, and the hash operation output that meets the access qualification together to the access point. After performing verification according to the mechanism in the present invention, the access point uploads the smart contract and the hash operation output that meets the access qualification required by the access point to the blockchain mining network, and meanwhile uploads the short packet sent from the IoT device to the core network to complete the service. After the smart contract is verified by the blockchain mining network, uploaded to the blockchain, and confirmed by a certain number of subsequent blocks, a service fee specified in the smart contract is automatically transferred from the IoT device account to an access point account.

Figure 2:
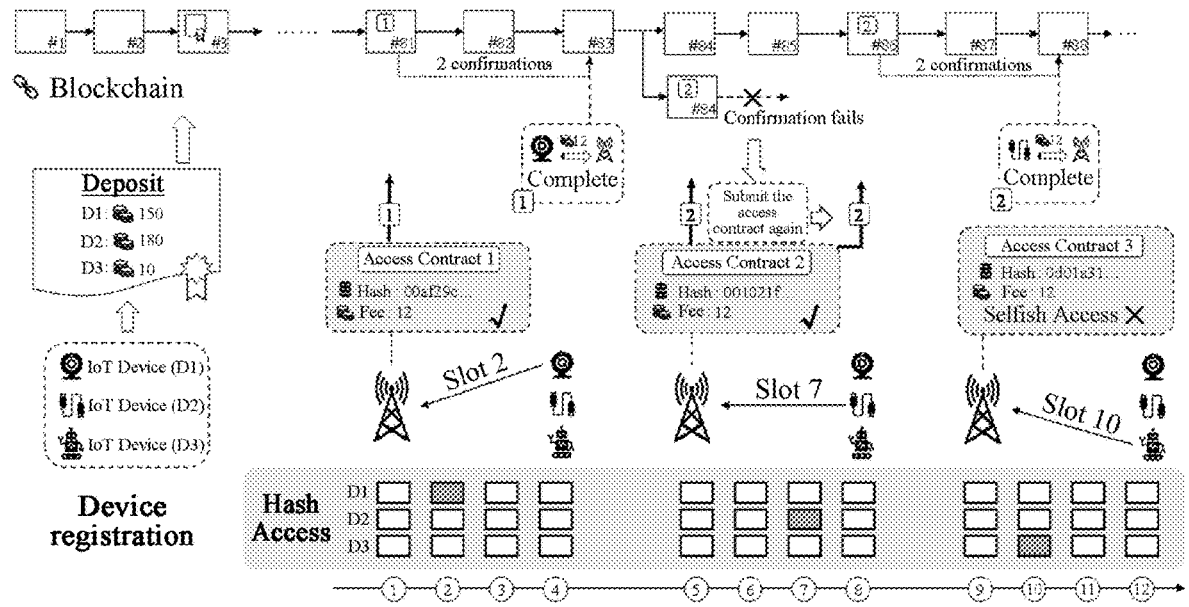
FIG. 2 is a schematic diagram of a work process of a blockchain-enhanced IoT architecture in a situation in which there is 1 access point for 3 IoT devices, and the number of confirmation blocks is set to 2.

Referring to FIG. 2, according to a typical embodiment of the present invention, specific parameters of a blockchain-enhanced open IoT architecture are given as follows: 1 access point that can provide an access service and 3 IoT devices (device numbers are device 1, device 2, and device 3).

As shown in FIG. 2, merely three IoT device access services taken place orderly in the typical embodiment of the present invention are shown. Corresponding smart contracts applying for the access services are respectively marked as smart contract 1, smart contract 2, and smart contract 3.

A typical implementation process of the present invention is as follows:

1) Before accessing an IoT network, the 3 IoT devices deposit a predetermined amount of tokens into blockchain accounts, which is a part of a registration process. The account balances of the 3 devices are respectively 150, 180, and 10. The registration information as a public ledger is recorded in a blockchain.

2) Before the services start, the IoT devices and the access point reach a consensus on the services. In the second slot, the device 1 fills in and signs the smart contract 1 that includes details of the access service. The service fee is 12. Then the device 1 sends the smart contract 1, a to-be-transmitted short packet, and a hash operation output that meets an access qualification required by the access point together to the access point to request the access point to provide the corresponding access service.

3) The access point, after receiving the short packet and the smart contract from the device 1, checks and verifies content and a signature of the smart contract 1, and checks whether the hash operation output of the device 1 actually meets the access qualification required by the access point, and whether the account balance is enough to pay for the service fee. After the check, the account balance of the device 1 is 150 which is enough to pay for the service fee, namely, 12. The access point directly uploads the smart contract 1 and the hash operation output to the blockchain mining network, and meanwhile directly provides the corresponding access service to the IoT device.

4) The smart contract 1 is updated to the blockchain through the blockchain mining network. After the smart contract 1 is confirmed by 2 subsequent blocks, the service fee specified in the smart contract 1 is automatically transferred from the account of the device 1 to an access point account to complete the transaction.

5) In the $7^{th}$ slot, the device 2 initiates the smart contract 2 according to a process similar to that of step 1 to step 4 and applies for an access service. However, the smart contract 2 is not accepted by the main chain and fails to be confirmed when updated to the blockchain. Therefore, to ensure self-benefit, the access point continues to upload the smart contract 2 to the blockchain mining network. Similarly, after the smart contract 2 is confirmed by 2 subsequent blocks, the service fee specified in the smart contract 2 is automatically transferred from the account of the device 2 to the access point account to complete the transaction.

6) In the $10^{th}$ slot, the device 3 initiates the smart contract 3 and applies for an access service. However, the access point, through checking, finds that the balance of the device 3 is not enough to pay for the fee of the access service. Therefore, the access point ignores the access application.

Figure 3:
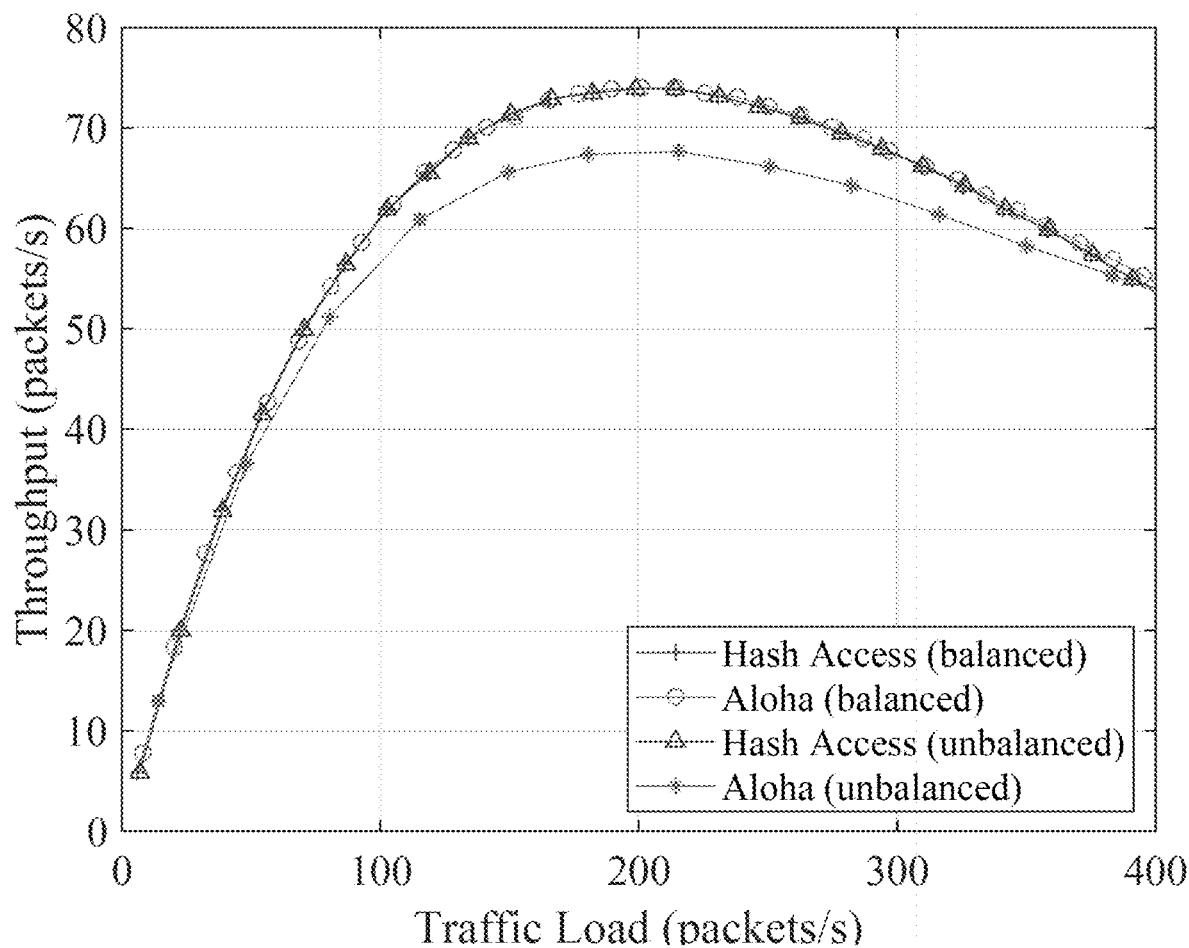
FIG. 3 shows comparisons in an IoT network in which there are two independent operators between throughput performance of a blockchain-enhanced open IoT access architecture and that of an access architecture using Aloha in a balanced network traffic load and in an unbalanced network traffic load.
Figure 4:
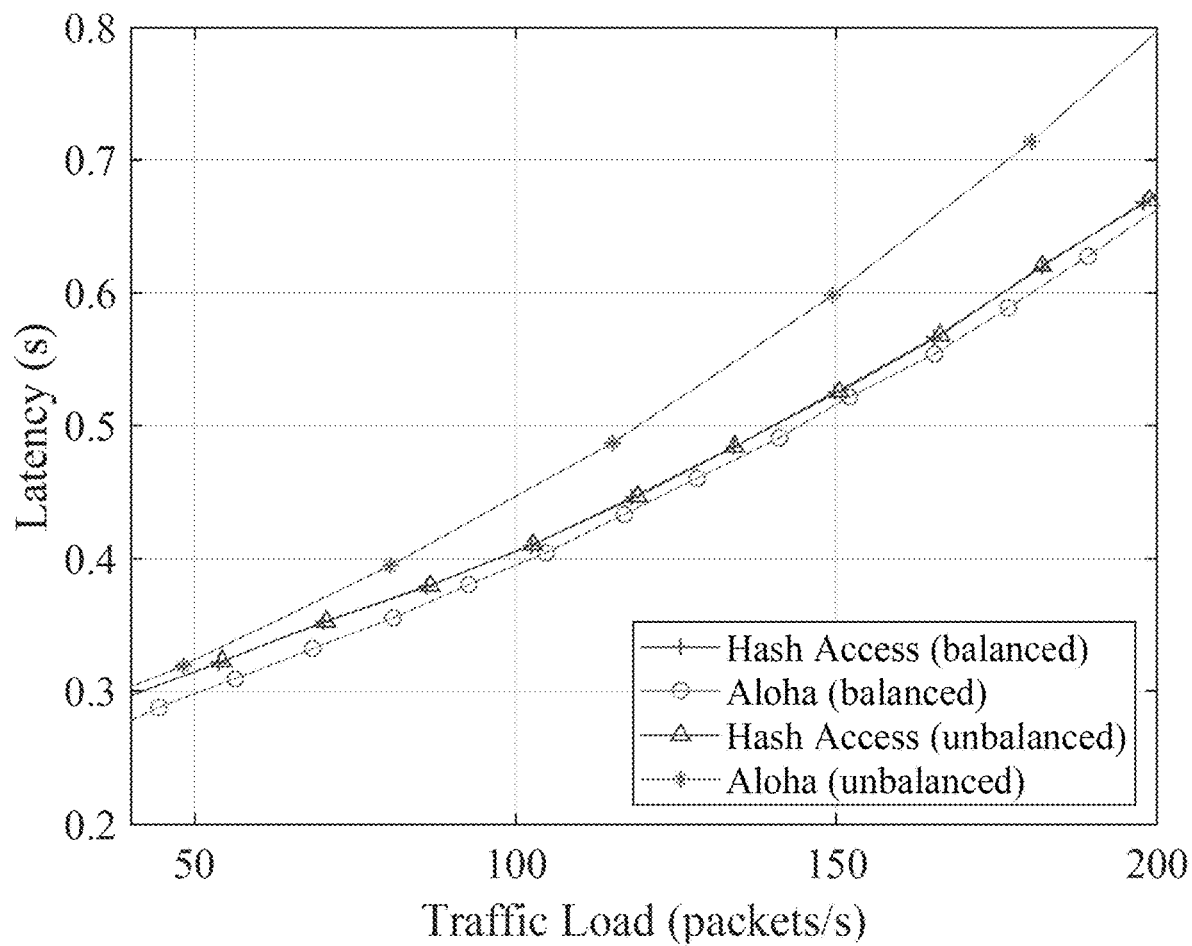
FIG. 4 shows comparisons in an IoT network in which there are two independent operators between a latency of a blockchain-enhanced open IoT access architecture and that of an access architecture using Aloha in a balanced network traffic load and in an unbalanced network traffic load.
Figure 5:
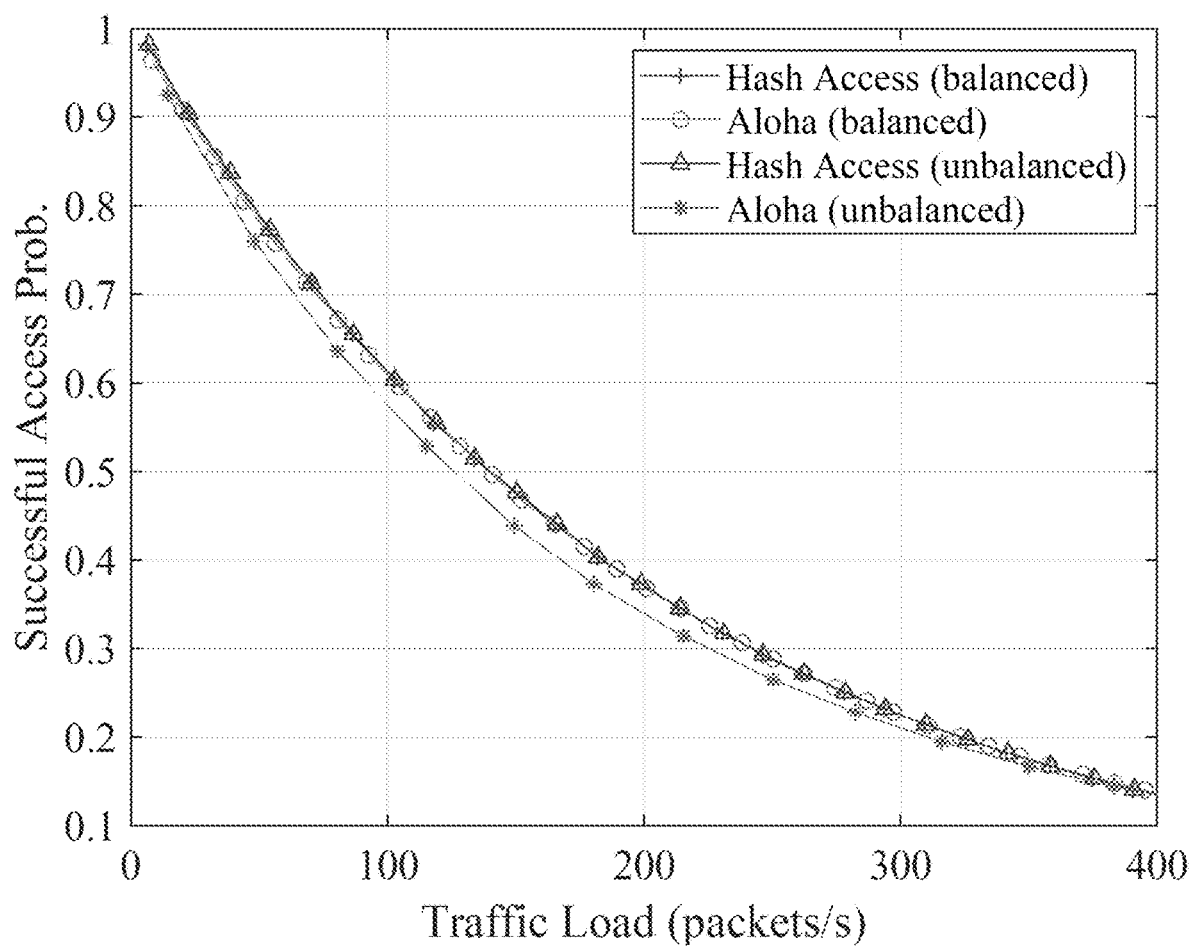
FIG. 5 shows comparisons in an IoT network in which there are two independent operators between a successful access probability of a blockchain-enhanced open IoT access architecture and that of an access architecture using Aloha in a balanced network traffic load and in an unbalanced network traffic load.

Referring to FIG. 3 to FIG. 5, in an IoT network in which there are two independent operators, emulation of a blockchain-enhanced open IoT access architecture is performed in a balanced network traffic load and an unbalanced network traffic load. Three pieces of performance of throughput, access latency, and successful access probability are analyzed and compared with those of an access architecture using Aloha. The results are as follows:

FIG. 3 reflects that in the whole IoT network, in a situation in which the service flow to access points of the two independent operators is balanced, the throughput of the blockchain-enhanced open IoT access architecture in the present invention is the same as that of the access architecture iusing Aloha. However, when the traffic load of the access points in the IoT network is not balanced, the access architecture in the present invention can enable, by using cross-network integration, a secure and reliable short-packet access service transaction to be performed between the access points of different operators and an IoT device, thereby maximizing a resource utilization rate, and keeping the throughput same as that in the balanced flow situation. However, in the conventional access architecture, because there is no trust between the devices, a cross-network cooperation cannot be conducted, leading to unreasonable resource distribution, and finally causing a decreased throughput.

FIG. 4 and FIG. 5 respectively reflect comparisons between two pieces of performance, namely, the access latency and the successful access probability of the architecture in the present invention and those of the conventional architecture in the foregoing situations. Similar to FIG. 3, the performance of the blockchain-enhanced open IoT access architecture in the present invention is almost the same as that of the conventional architecture when the network traffic load is balanced. However, when the traffic load of the access point of the IoT network is unbalanced, the access architecture in the present invention can optimize the resource distribution by using cross-network integration, to ensure network performance, while the performance of the conventional access architecture is reduced relatively significantly.

Although the present invention is described with reference to the above exemplary embodiments, the embodiments are not intended to limit the present invention. A person of ordinary skill in the art may make variations and modifications without departing from the spirit and scope of the present invention. Therefore, the protection scope of the present invention should be subject to the claims.

What is claimed is:

1. A blockchain-enhanced open Internet of Things (IoT) access architecture, comprising: an access point, an IoT device, a blockchain mining network, and a core network; wherein the access point provides a short-packet access service to the IoT device, and a process of the short-packet access service is controlled by a blockchain enabling mechanism;

wherein control steps of the blockchain enabling mechanism comprises:
1) depositing, by the IoT device, a predetermined amount of tokens into a blockchain account of the IoT device before accessing an IoT network, wherein registration information is recorded in a blockchain;
2) filling in and signing, by the IoT device, a smart contract comprising details of the short-packet access service before the short-packet access service starts, and performing, by the IoT device, a hash operation by using the smart contract, a to-be-transmitted short packet, a device identification code, and a timestamp, wherein when a hash operation output of the IoT device meets an access condition required by the access point, the IoT device sends the smart contract, the to-be-transmitted short packet, and the hash operation output meeting the access condition of the access point together to request the access point to provide the short-packet access service; and
3) checking and verifying, by the access point after receiving the to-be-transmitted short packet and the smart contract from the IoT device, whether the hash operation output of the IoT device has an access condition required by a current access point, and checking and verifying content and a signature of the smart contract, and an account balance of the IoT device, wherein after a verification succeeds, the access point uploads the smart contract and a hash value of the to-be-transmitted short packet to the blockchain mining network, and directly uploads the to-be-transmitted short packet sent from the IoT device to the core network to complete the short-packet access service.

2. The blockchain-enhanced open IoT access architecture according to claim 1, wherein the control steps of the blockchain enabling mechanism further comprises:
4) recording, by the blockchain mining network, the smart contract in the blockchain, after checking and verifying the smart contract comprising an access request and being sent by the IoT device, after a predetermined number of subsequent blocks confirm the smart contract, a service fee specified in the smart contract being automatically transferred from an IoT device account to an access point account to achieve a final settlement of a transaction, wherein if the smart contract is not successfully confirmed in the blockchain, the access point uploads the smart contract to the blockchain mining network again out of self-benefit until the smart contract is confirmed in the blockchain, that is, ensures that the transaction is completed and the IoT device successfully pays the service fee to the access point.

3. The blockchain-enhanced open IoT access architecture according to claim 1, wherein the details of the short-packet access service in step 2 comprise: a fee of the short-packet access service, relevant access control information, and digital signatures of the IoT device and the access point.

4. The blockchain-enhanced open IoT access architecture according to claim 1, wherein the hash value generated by the IoT device in step 2 plays a role in verifying the IoT access request, and the hash value operated by the IoT device is an easy-to-verify, hard-to-solve, and tamper-proof string of a fixed length calculated by the IoT device by using a hash function to perform bytecode concatenating on the information in step 2.

5. The blockchain-enhanced open IoT access architecture according to claim 1, wherein in step 3, after receiving the access request, the access point checks and verifies relevant content of the smart contract, and checks the account balance of the IoT device initiating the access request, and once the verification succeeds, the access point directly provides the short-packet access service to the IoT device and uploads the to-be-transmitted short packet to the core network without waiting for the smart contract to be confirmed in the blockchain, that is, provides the short-packet access service before the IoT device pays.

6. The blockchain-enhanced open IoT access architecture according to claim 1, wherein the checking the account balance of the IoT device in step 3 is specifically: checking whether the account balance of the IoT device is enough to pay for the service fee, and if the account balance is not enough to pay for the service fee, the access point ignores the access request of the IoT device.

7. A cross-network integrated open IoT, wherein a plurality of operators or manufacturers are connected to form a whole by using the blockchain-enhanced open IoT access architecture according to claim 1, wherein the cross-network integrated open IoT allows fair access of all devices instead of the IoT device belonging to a specific operator or manufacturer, and ensures openness and transparency of an access and payment process through a blockchain.

8. The cross-network integrated open IoT according to claim 7, wherein the control steps of the blockchain enabling mechanism further comprises:
4) recording, by the blockchain mining network, the smart contract in the blockchain, after checking and verifying the smart contract comprising an access request and being sent by the IoT device, after a predetermined number of subsequent blocks confirm the smart contract, a service fee specified in the smart contract being automatically transferred from an IoT device account to an access point account to achieve a final settlement of a transaction, wherein if the smart contract is not successfully confirmed in the blockchain, the access point uploads the smart contract to the blockchain mining network again out of self-benefit until the smart contract is confirmed in the blockchain, that is, ensures that the transaction is completed and the IoT device successfully pays the service fee to the access point.

9. The cross-network integrated open IoT according to claim 7, wherein the details of the short-packet access service in step 2 comprise: a fee of the short-packet access service, relevant access control information, and digital signatures of the IoT device and the access point.

10. The cross-network integrated open IoT according to claim 7, wherein the hash value operated by the IoT device in step 2 plays a role in verifying the access condition required by the IoT device, and the hash value operated by the IoT device is an easy-to-verify, hard-to-solve, and tamper-proof string of a fixed length calculated by the IoT device by using a hash function to perform bytecode concatenating on the information in step 2.

11. The cross-network integrated open IoT according to claim 7, wherein in step 3, after receiving the access request, the access point checks and verifies relevant content of the smart contract, and checks the account balance of the IoT device initiating the access request, and once the verification succeeds, the access point directly provides the short-packet access service to the IoT device and uploads the to-be-transmitted short packet to the core network without waiting for the smart contract to be confirmed in the blockchain, that is, provides the short-packet access service before the IoT device pays.

12. The cross-network integrated open IoT according to claim 7, wherein the checking the account balance of the IoT device in step 3 is specifically: checking whether the account balance of the IoT device is enough to pay for the service fee, and if the account balance is not enough to pay for the service fee, the access point ignores the access request of the IoT device.

\* \* \* \* \*